May 17, 1960 H. M. HUGE ET AL 2,937,328
REGULATED RECTIFIER
Filed Aug. 5, 1957
3 Sheets-Sheet 2

INVENTORS.
HENRY M. HUGE
STEPHEN L. MERKEL
BY Hoodling and Krost
ATTORNEYS.

May 17, 1960 H. M. HUGE ET AL 2,937,328
REGULATED RECTIFIER
Filed Aug. 5, 1957 3 Sheets-Sheet 3

INVENTORS.
HENRY M. HUGE.
STEPHEN L. MERKEL
BY
Woodling and Krost
attys

United States Patent Office 2,937,328
Patented May 17, 1960

2,937,328
REGULATED RECTIFIER

Henry M. Huge, Bay Village, and Stephen L. Merkel, Lorain, Ohio

Application August 5, 1957, Serial No. 676,273

9 Claims. (Cl. 321—19)

This invention deals with a regulated rectifier and more particularly with a system for controlling the flow of current through a rectifier to a load so as to minimize changes of load voltage, or alternatively, changes of load current.

An object of this invention is to provide an improved circuit for regulating the saturation of a saturable core device which controls the flow of rectified current.

Another object of this invention is to employ transistors for controlling the saturation of a regulating reactor.

Still another object of this invention is to maintain a constant output voltage by comparing the output voltage with the voltage developed across a Zener diode and by employing a transistor amplifier which responds to voltage deviations.

A further object of the invention is to maintain a constant voltage for load currents less than a specified maximum load current, and to maintain a constant current in case of load requirements beyond the predetermined maximum.

A still further object of the invention is to operate a plurality of constant voltage rectifiers in parallel with each other so they share the load in a predetermined manner.

Other objects and a better understanding of the invention will be obtained by referring to the following specifications and claims together with the accompanying drawings in which:

Saturable reactors controlled by direct current, known as transductors, have been widely used for regulating the output of a rectifying arrangement. One such system in which the output of the rectifying arrangement is compared with a reference potential is described in U.S. Patent 2,653,293 issued September 22, 1953. This invention is an improvement over the invention disclosed and claimed in Patent 2,653,293 and employs a Zener diode as a constant voltage device to establish a reference potential. The voltage across the Zener diode is compared with at least a portion of the rectified output voltage and the differential voltage is amplified through one or more transistors to regulate the saturation of a transductor which controls the rectified output voltage.

Figure 1:
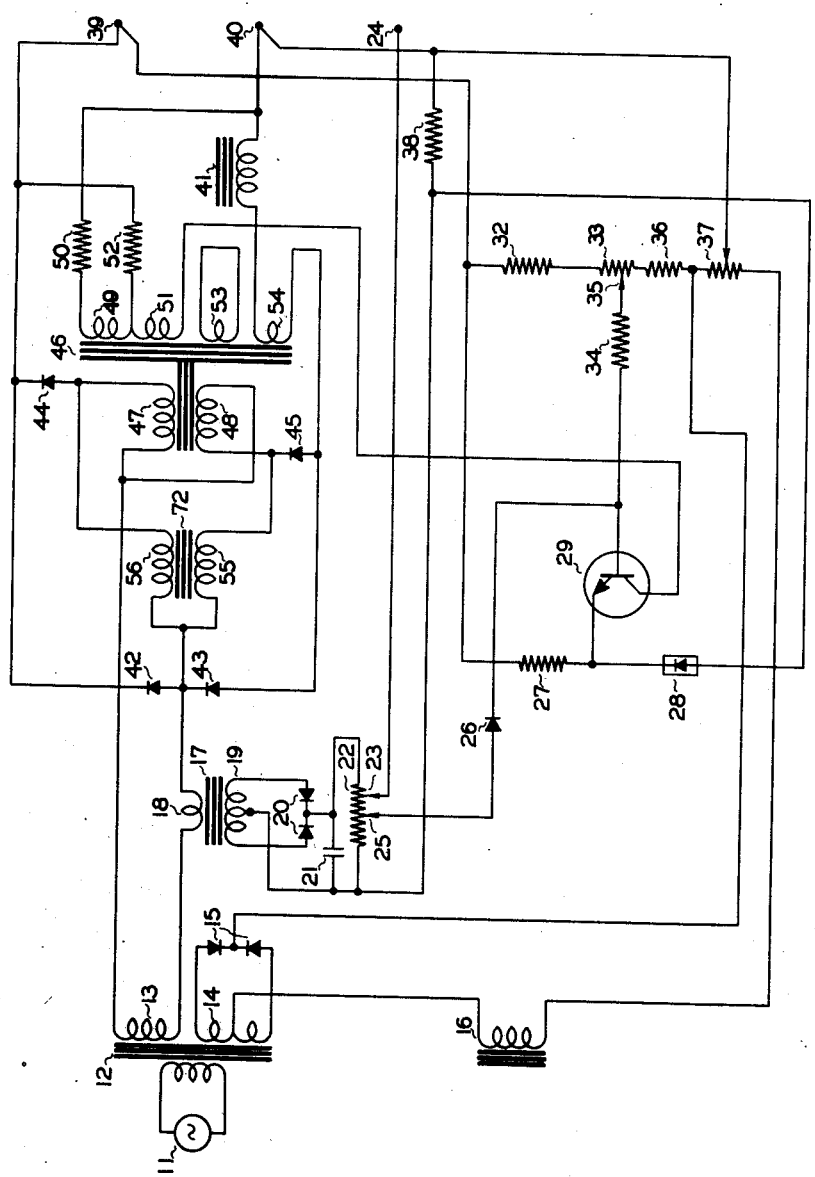
Figure 1 is a schematic diagram of a regulated rectifier according to our invention.

With reference to Figure 1, the direct current output terminals 39 and 40 are supplied from source 11 through the rectifying elements 42, 43, 44 and 45. These rectifying elements are energized from the secondary winding 13 of input transformer 12 which is energized by source 11. The transductor 46 has impedance or gate windings 47 and 48 respectively in series with the rectifying elements 44 and 45 to control the flow of rectified output current. On the schematic diagram, the transductor 46 is shown symbolically as a T-shaped structure. It will be understood that the transductor may take any one of several forms known in the art, one form being a three-legged core structure with impedance windings 47 and 48 on the outer legs and saturating windings 49, 51 and 54 on the center leg. In another form, the transductor may comprise two magnetic cores, with impedance winding 47 on the one core, impedance winding 48 on the other core, and saturating windings 49, 51, and 54 common to both cores. The circuit shown comprises a self-saturating transductor circuit, in which each impedance winding carries load current during a portion of the alternating current cycle. The D.-C. component of current through each impedance winding saturates the transductor, reducing its impedance as the load current increases.

The shorted winding 53 shown on transductor 46 is used to minimize induced voltages in the saturating windings 49 and 51. Its use is optional, as the circuit function as described herein is not dependent on winding 53.

The positive output terminal 39 is connected to rectifier elements 42 and 44, the negative output terminal 40 is connected to rectifier elements 43 and 45 through the filter choke 41 and the compounding winding 54. The circuit as shown thus comprises a choke input type of filter. A capacitor input filter can also be used without substantially altering the method of control of the regulated rectifier. The compounding winding 54 will generally be different for a capacitor input filter than for a choke input filter. With choke input filter, as shown, compounding winding 54 is preferably phased so that increasing load current reduces the saturation of the transductor. The phasing is preferably reversed for capacitor input filter.

The saturation of transductor 46 is controlled primarily by current through the saturating windings 49 and 51. As shown, winding 49 is a biasing winding energized through resistors 52 and 50 and polarized to saturate the transductor positively, in the same direction as the saturation produced by load current through impedance windings 47 and 48. Current through winding 51 reduces the saturation of the transductor and controls the output voltage across terminals 39 and 40. Winding 51 is energized through the collector of transistor 29. The base-to-emitter voltage of transistor 29 is a measure of the deviation between the output voltage across terminals 39 and 40 and the standard voltage established by Zener diode 28.

The Zener diode 28 is connected in series with resistors 27 and 38 across the direct current output terminals 39 and 40. Resistor 38 has a relatively low resistance and can be neglected at the current values normally passed through the Zener diode. The resistors 32, 33, and 36 comprise a voltage divider which is also connected across terminals 39 and 40. The voltage at the adjustable slider 35 is a fraction of the output voltage which is balanced against the Zener diode voltage. By connecting the base of transistor 29 to slider 35 and the emitter of transistor 29 to the junction between resistor 27 and Zener diode 28, any deviation in the voltage across terminals 39 and 40 impresses a corresponding base-to-emitter voltage on transistor 29.

Resistor 27 is chosen so that the Zener diode 28 is normally operated at a flat part of its characteristic curve, so that the voltage across it changes very little in normal operation. If the output voltage across terminals 39 and 40 rises above normal, the base of transistor 29 becomes positive with respect to its emitter, and collector current will flow through the saturating winding 51 to reduce the saturation of transductor 46 and restore the output voltage to normal.

The elements are preferably proportioned so the emitter current of transistor 29 is relatively small compared with the current normally passed by the Zener diode. The Zener diode 28 has a low internal resistance, so this emitter current has relatively little effect on the voltage across the diode.

The resistors 50 and 52 are proportioned so that the bias current through winding 49 and resistor 50, in the absence of collector current through transistor 29, drops the collector voltage applied to the transistor to a value within its rating. In some cases the circuit voltages are such that the reduction in voltage is not needed and resistor 52 can be omitted.

With resistor 52 in the circuit, however, the flow of collector current through transistor 29 not only increases the saturating current through winding 51, it also reduces the bias current through winding 49, thereby increasing the effectiveness of the current through transistor 29. A sufficient increase of collector current can thus readily reverse the direction of the magnetizing force produced by these windings to obtain maximum control over the impedance of the transductor.

Variations in the voltage of source 11 tend to produce corresponding variations in the rectified voltage across terminals 39 and 40. The action of the regulating circuit just described tends to minimize these variations, but, particularly with a single stage transistor amplifier as shown in Figure 1, the compensation may not be adequate. To correct for variations in the voltage of source 11, a compensating voltage is impressed across resistor 37. This compensating voltage is derived from secondary winding 14 of transformer 12 which energizes rectifier 15 which in turn impresses a D.-C. voltage across resistor 37 through filter choke 16. The voltage across resistor 37, therefore, increases with rising voltage of source 11. A portion of this variable voltage, selected by adjustment of resistor 37, is connected in series with the output voltage from terminals 39 and 40. The combination voltage is impressed across the voltage divider comprising resistors 32, 33 and 36, making the base of transistor 29 more positive with increasing voltage of source 11. The saturation of transductor 46 is thereby reduced with increasing source voltage by an amount which can be adjusted to maintain precisely regulated output voltage across terminals 39 and 40.

When a regulated rectifier is used to float and charge a storage battery, or when certain other types of variable load are supplied from the rectifier, the output current must be limited to a value within the capacity of the components. If it is not, an overload condition, such as a discharged battery, will either damage the circuit components or trip protective devices which may be in the supply circuit. The embodiment of our invention shown in Figure 1 incorporates a current limiting feature whereby the regulated rectifier changes from a constant voltage device to a constant current device at a predetermined value of load current. This is accomplished through the use of current transformer 17 having primary winding 18 connected in the alternating current supply circuit to the rectifier elements 42, 43, 44 and 45. The secondary winding 19 of transformer 17 supplies current to full-wave rectifier 20, which supplies direct current to resistor 22. Capacitor 21 is shown connected across resistor 22 as a filter to reduce the ripple voltage in this circuit. The current through resistor 22 is substantially proportional to the output current supplied from terminals 39 and 40. Slider 25 on resistor 22 is connected to the base of transistor 29 through diode 26. The negative terminal of resistor 22 is connected to the negative terminal of the Zener diode 28.

As long as the voltage developed at slider 25 is less than the voltage across the Zener diode 28, diode 26 blocks, and prevents the flow of current in this circuit. However, as soon as the load current reaches a value sufficient to produce at slider 25 a voltage greater than the voltage across the Zener diode, this voltage is impressed on the base of transistor 29 through diode 26. Resistor 34 is shown connected between slider 35 and the base of transistor 29 as a means of minimizing the current drain on the cutoff rectifier 20 by the voltage divider 32, 33, 36. However, in some cases the impedance of the voltage divider 32, 33, 36 may be high enough compared with the impedance of the rectifier 20 and its resistor 22, and the resistor 34 may be omitted.

When the potential of slider 25 is impressed on the base of transistor 29, the control of the regulated rectifier is transferred to the current transformer 17 and associated elements, and the rectifier becomes a constant current device. Any increase in the output current of the regulated rectifier impresses an increasingly positive voltage on the base of transistor 29, causing its collector current to increase and thereby reduce the saturation of transductor 46 so as to limit the output current of the rectifier. As previously mentioned, the net saturating effect of windings 49 and 51 can be reversed in this way to oppose the self-saturation of the transductor and provide optimum current limiting effect.

Transformer 72 has winding 56 connected from one side of winding 13 to the junction between rectifier element 44 and load winding 47. The other winding 55 on transformer 72 is connected from the same side of winding 13 to the junction between load winding 48 and rectifier element 45. This transformer acts primarily as an impedance element, shunted acrosss the A.-C. line at the input terminals of rectifier elements 44 and 45. The current which flows through windings 55 and 56 while the respective rectifier elements 45 and 44 are non-conductive tends to desaturate the transductor 46 thereby increasing its impedance. Transformer 72 is particularly effective in holding down the output voltage when there is very little or no load connected across direct current output terminals 39 and 40. The maintenance of regulated output voltage under light load conditions could be achieved equally well with coils 55 and 56 wound on separate cores, but the transformer action which results from having them wound on the common transformer 72 aids in maintaining balanced voltages across the load windings 47 and 48, and in this respect has an effect similar to the shorted winding 53 on transductor 46.

The use of transformer 72 is optional, in many cases satisfactory results can be obtained without it. It is to be noted that the action of the saturating windings themselves may tend to short the induced voltages in these windings unless they are associated with high impedance circuits. In the circuit shown in Figure 1, no provision for high impedance circuits has been made, because the effective impedance is set at a low value by the action of shorted winding 53 and transformer 72.

The regulated rectifier of Figure 1 has an additional feature whereby it can be operated in parallel with another similar rectifier and their output currents divided equally or shared in proportion to their ratings. As is well known, when two constant voltage devices are operated in parallel with each other, the division of load current is usually extremely unequal. This is true because one of the constant voltage devices will have a slightly higher output voltage than the other and, if it is a truly constant voltage device, it will maintain this higher voltage out to its full load capacity. This, the second device will not carry any load until the first begins to lose regulation due to an overload condition.

With the paralleling feature shown in Figure 1, the required division of load between a plurality of constant voltage rectifiers can be accurately maintained without loss of voltage regulation. Terminal 24 is a paralleling terminal, energized from slider 23 of resistor 22.

Figure 2:
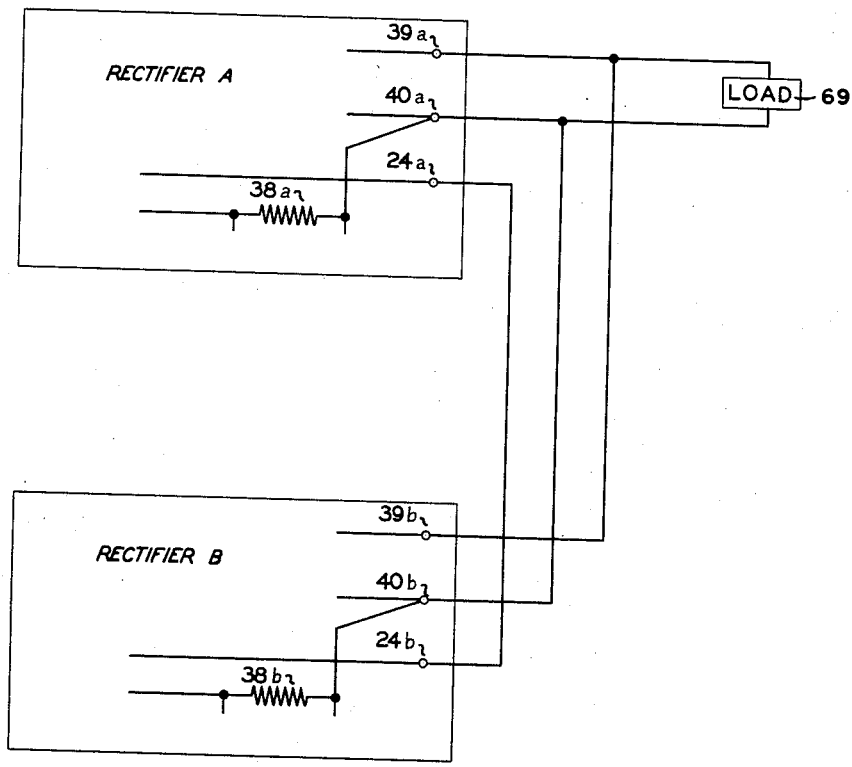
Figure 2 is a schematic diagram showing a portion of the circuits of two or our regulated rectifiers operating in parallel.

Figure 2 shows how two of the rectifiers, according to Figure 1, are connected together to supply current to a common load 69. The two rectifiers in Figure 2 are designated as rectifier A and rectifier B. A portion of the control circuit is shown for each of the rectifiers in Figure 2. The positive output terminals 39a and 39b are connected together to serve as a positive output lead, and terminals 40a and 40b are connected together to serve as a negative output lead. Terminal 24a is connected to terminal 24b.

The potential between terminal 24 and terminal 40 in each rectifier is determined by the voltage across a portion of resistor 22, as adjusted by slider 23. Slider 23 is adjusted to deliver a predetermined voltage at rated output current of the rectifier. At lower values of load current, the voltage developed in this circuit will be proportionately lower. When the two rectifiers are operated in parallel, if rectifier A is delivering more than its share of the total load, the voltage developed at terminal 24a will be more positive than the voltage developed at terminal 24b. As a result, current will flow from left to right through resistor 38b, and from right to left through resistor 38a.

By referring back to Figure 1, it will be noted that when current flows from right to the left through resistor 38, the voltage across resistor 38 subtracts from the voltage across the Zener diode 28, thereby reducing the standard voltage in the circuit. Conversely, when the current flows from left to right, the voltage developed across resistor 38 adds to the voltage across the Zener diode and raises the standard voltage in the rectifier. Thus, the standard voltage and hence the output voltage of the rectifier delivering too much current is reduced, and the output voltage of the rectifier which is not delivering enough current is increased. As previously mentioned, the resistors 38a and 38b are of a relatively low value so that they do not interfere with the normal functioning of the Zener diode reference circuit when the rectifiers are operating singly or when they are sharing the load properly.

Although Figure 2 shows two rectifiers operating in parallel, the operation of three or more rectifiers is equally satisfactory and their function is as has been described for the two units. It is not necessary that all of the rectifiers have the same rated output current, so long as each is adjusted so that at its rated output current it will develop the predetermined voltage at terminal 24.

Figure 3:
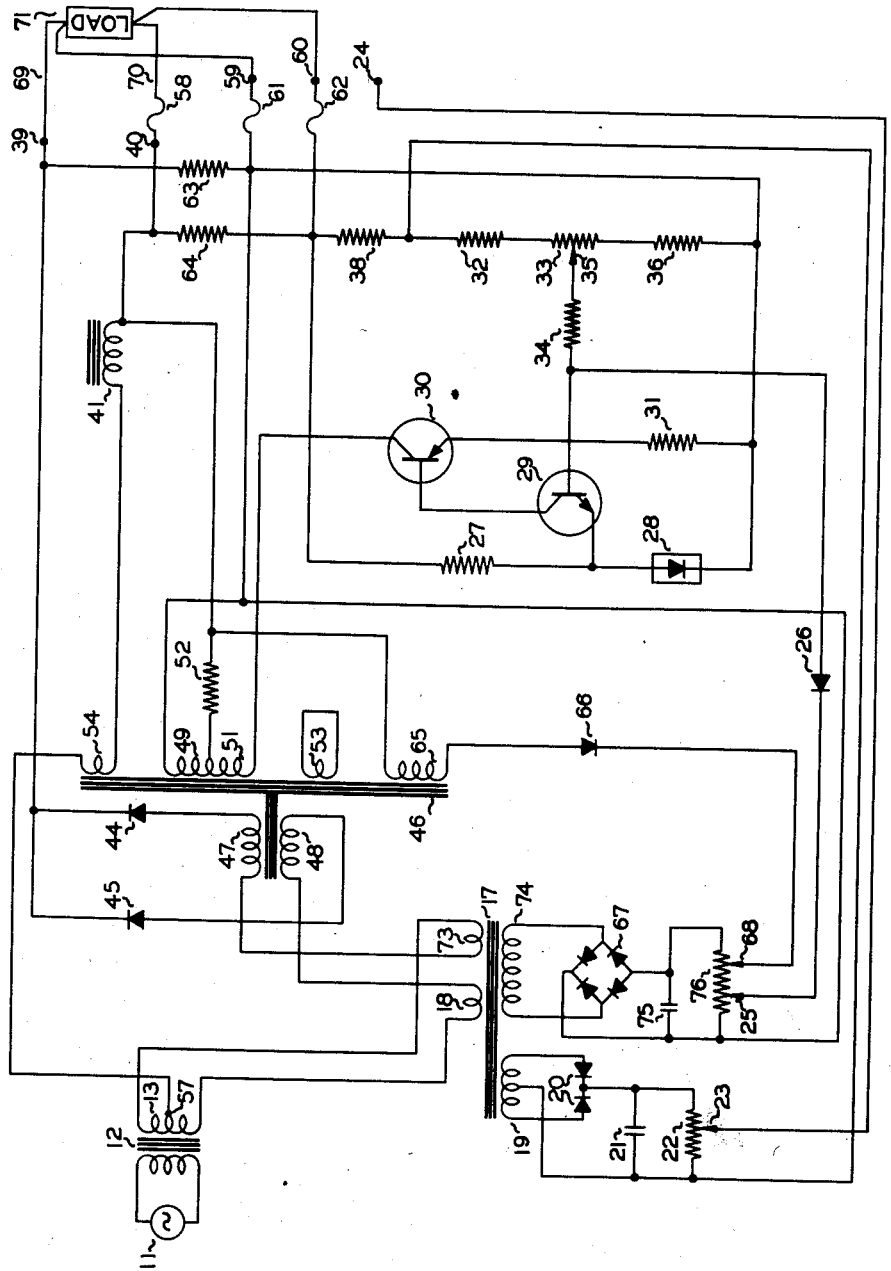
Figure 3 is a schematic diagram of another embodiment of the invention including means for regulating the voltage at a load remote from the regulated rectifier.

In the schematic diagram shown in Figure 3, a two-stage transistor amplifier is used to control the saturation of the transductor 46. The power rectifier circuit comprises a center-tapped full wave arrangement with rectifier elements 44 and 45 supplying the positive output lead and center tap 57 on the secondary winding 13 supplying the negative output lead. The function of the transductor in Figure 3 is substantially the same as that of the transductor in Figure 1, with rectifier element 44 in series with impedance winding 47 and rectifier element 45 in series with impedance winding 48.

The saturating windings in Figure 3 are polarized oppositely to those in Figure 1. Bias winding 49 energized through resistor 52 magnetizes the core in the opposite direction to that produced by the current through impedance windings 47 and 48. The saturating current through winding 51 is in the direction to increase the saturation of the transductor and thereby to increase the voltage across output terminals 39 and 40. It will be noted that the choice of the polarity of the saturating windings is not necessarily limited by the number of stages in the amplifier or the type of transistor being used.

Figure 3 also shows a remote sensing circuit whereby the voltage across a load remote from the regulated rectifier can be regulated to the required degree of accuracy. The remote sensing circuit includes a protective feature so that control of the output voltage can be returned to terminals 39 and 40 in case of trouble in the load leads 69 and 70 or in the voltage sensing leads, or in case the circuit protective element 58 operates to open the load circuit.

The remote voltage sensing circuit is terminated at terminals 59 and 60. A lead from terminal 59 is extended to the positive terminal of the load 71 at the point where the voltage is to be regulated. Likewise, a lead is extended from terminal 60 to the negative terminal of the load 71 at the point at which the voltage is to be regulated. In case of a short circuit in these voltage sensing leads, fuses 61 and 62 will operate, leaving the voltage sensing circuit connected to terminals 39 and 40 through resistors 63 and 64 respectively.

In case the circuit protective element 58 opens for any reason, or in case of other trouble in the load leads 69 and 70 whereby the load 71 becomes disconnected from the output terminals 39 and 40, a difference in potential will immediately appear between terminal 39 and terminal 59 or between terminal 40 and terminal 60. The fuses 61 and 62 and resistors 63 and 64 are proportioned so that the one or both fuses will blow under this condition, thereby returning the voltage sensing control to the output terminals 39 and 40. The protective circuit as shown prevents any trouble in the load circuit from producing an abnormally high voltage across output terminals 39 and 40, while at the same time enabling very precise control of the voltage across the load under conditions where the voltage drop between the terminals of the regulated rectifier and the load may be substantial or unpredictable.

The Zener diode in Figure 3 has been reversed, and is connected to the positive output terminal, while its series resistor 27 is connected to the negative output terminal. The voltage divider 32, 33, 36, is connected to the voltage sensing terminals 59 and 60 through the fuses 61 and 62. In case the voltage across these terminals falls below normal, the base of transistor 29 becomes positive with respect to its emitter, causing it to conduct. The collector of the n-p-n transistor 29 is connected directly to the base of p-n-p transistor 30. The collector current of transistor 29 flows in the base-emitter circuit of p-n-p transistor 30. The collector of transistor 30 is connected to the negative terminal 40 through resistor 52 and saturating winding 51. Therefore, when the output voltage falls below normal, increased saturating current is passed through winding 51 by means of the emitter-collector circuit of transistor 30. Resistor 31 is a stabilizing element which limits the maximum current which can be passed through this circuit. The value of resistor 31 depends upon the choice of transistors and circuit voltages, and this resistor may be omitted in some cases.

The current limiting feature of the circuit in Figure 3 is similar in some respects to that shown in Figure 1. Current transformer 17 in Figure 3 has two primary windings, winding 18 and winding 73. These windings conduct current respectively during alternate half cycles of the source voltage to rectifying elements 45 and 44. It also has two secondary windings 19 and 74. The bridge rectifier 67 is energized from secondary winding 74 of current transformer 17 and supplies direct current to resistor 76 shunted by filter capacitor 75. Slider 25 on resistor 76 is connected to the base of transistor 29 through blocking diode 26. The positive terminal of resistor 76 is connected to the positive voltage sensing terminal 59. Whenever the voltage developed between the positive terminal of resistor 76 and slider 25 exceeds the voltage across the Zener diode 28, the blocking diode 26 becomes conductive so that the potential of the base of transistor 29 becomes very nearly the potential of slider 25. As in Figure 1, resistor 34 may be used when necessary to assure that the voltage control through diode 26 will supersede the voltage control from slider 35.

It is sometimes preferable to operate with relatively little bias current through winding 49 in order to allow maximum effectiveness of the positive saturating current passed by transistor 30 through saturating winding 31. Thus the reverse bias current through winding 49 may be insufficient to lower the rectified output voltage to the required level even when the potential applied through diode 26 to the regulating circuit causes complete cutoff of the saturating current through winding 51. To provide additional desaturating current for transductor 46, winding 65 is connected through blocking diode 66 to slider 68 on resistor 76. This slider is preferably adjusted so that the voltage developed between the positive terminal of resistor 76 and slider 68 approximately equals the voltage across terminals 39 and 40 when the voltage at slider 25 equals the voltage across reference diode 28. Therefore, as the rectified output voltage is lowered by the action of the current limiting control, current will be passed through winding 65 and diode 66 to slider 68 to insure optimum desaturation of transductor 46.

Winding 19 on current transformer 17 supplies current to rectifier 20 as in Figure 1. The output of rectifier 20 is fed to resistor 22 which is shunted by capacitor 21. The output of this circuit is used to feed the paralleling tap 24 on the positive side and is connected to terminal 60 on the negative side through resistor 38 and fuse 62. The operation of this portion of the cicruit is the same as in Figures 1 and 2, with two isolated windings 19 and 74 being used in Figure 3 in order to provide freedom of choice in the type of transistors used in the voltage regulating circuit. It will be noted that the positive terminal of rectifier 67 is connected to the positive voltage sensing terminals 59 and a voltage could not be derived from resistor 76 to energize terminal 24 at a potential which is a specified voltage positive with respect to the negative load terminal as is the case in Figure 1. The circuit of Figure 3 as shown represents a regulated rectifier which can be operated in parallel with the regulated rectifier shown in Figure 1, by connecting together the terminals marked 24 as is shown in Figure 2.

It will be apparent that the features shown in Figure 1 and Figure 3 are for the most part interchangeable. Numerous other modifications which will be apparent to those skilled in the art may also be employed without departing from the spirit and scope of our invention. The given merely by way of example and changes in the details specific embodiments of our invention shown herein are of construction and the combination and arrangement of parts may be resorted to without departing from the spirit and scope of the invention as hereinafter claimed.

What is claimed is:

1. In combination, a rectifier for rectifying current from an alternating current supply source and for supplying the rectified current to a load circuit, a saturable reactor for controlling the current supplied from said source to said load circuit, said reactor having an impedance winding which limits the flow of current through said rectifier and a saturating winding to which current is supplied for controlling the impedance of said impedance winding, a transistor having a collector, an emitter and a base, a current path comprising said saturating winding connecting said collector to said load circuit, a second current path connected across said load comprising in series a first resistor and a constant voltage device, an auxiliary rectifier, a second resistor, means for energizing said auxiliary rectifier from said alternating current source and means for supplying rectified current from said auxiliary rectifier to said second resistor, a resistance path connected across said load, a closed circuit extending between the base and the emitter of said transistor and including a portion of said resistance path, at least a portion of said second resistor, and said constant voltage device, the voltages in said closed circuit being polarized so that the voltage across said second resistor is added to the voltage across the portion of said resistance path.

2. In combination, a rectifier for rectifying current from an alternating current supply source and for supplying the rectified current to a load circuit, a saturable reactor for controlling the current supplied from said source to said load circuit, said reactor having impedance winding means for limiting the flow of current through said rectifier and a saturating winding to which current is supplied for controlling the impedance of said impedance winding means, a transistor having a collector, an emitter and a base, a current path comprising said saturating winding connecting said collector to said load circuit, a second current path connected across said load comprising in series a first resistor and a constant voltage device, an auxiliary rectifier, a second resistor, means for energizing said auxiliary rectifier from said source of alternating current, means for supplying rectified current from said auxiliary rectifier to said second resistor, a resistance path connected across said load and including at least a portion of said second resistor, and a closed circuit extending between the base and the emitter of said transistor and including said constant voltage device and at least a portion of said resistance path.

3. In combination, a first rectifier, means for connecting said first rectifier between an alternating current supply source and a direct current load circuit, a saturable reactor having impedance winding means for controlling the flow of current through said first rectifier and having saturating winding means for controlling the impedance of said impedance winding means, a transformer having its primary winding serially connected between the source of alternating current and the first rectifier, a second rectifier energized from the secondary winding of said transformer, a resistor energized from said second rectifier with a voltage which increases as the current in said load circuit increases, a transistor having a base, collector, and emitter, means for supplying current to said collector through said saturating winding, a constant voltage device, a resistance path connected across said load, a first closed circuit between the base and emitter of said transistor and including said constant voltage device and at least a portion of said resistance path, a second closed circuit between the base and emitter of said transistor and including a diode, at least a portion of said resistor, and said constant voltage device, said diode being polarized to render said second current path substantially inoperative as long as the voltage across said portion of the resistor is less than the voltage across said constant voltage device.

4. In combination, a first rectifier, means for connecting said first rectifier between an alternating current supply source and a direct current load circuit, a saturable reactor having impedance winding means for controlling the flow of current through said first rectifier and having saturating winding means for controlling the impedance of said impedance winding means, a transformer having its primary winding serially connected between the source of alternating current and the first rectifier, a second rectifier energized from the secondary winding of said transformer, a first resistor energized from said second rectifier with a voltage which increases as the current in said load circuit increases, a transistor having a base, collector, and emitter, means for supplying current to said collector through said saturating winding, a constant voltage device, a resistance path connected across said load, a first closed circuit between the base and emitter of said transistor and including said constant voltage device, at least a portion of said resistance path and a second resistor, a second closed circuit between the base and emitter of said transistor and including a diode, at least a portion of said first resistor, and said constant voltage device, said diode being polarized to render said second current path substantially inoperative as long as the voltage across said portion of said first resistor is less than the voltage across said constant voltage device, said second resistor making the resistance of said first current path high with respect to the resistance of said second current path when said diode is conductive.

5. In combination with a source of unidirectional voltage which may vary and having positive and negative terminals, a reactor, means comprising said reactor for controlling the voltage of said source, a transistor having a collector, an emitter and a base, a current path extending from one to the other of said terminals and comprising a winding on said reactor and the collector-emitter of said transistor, first circuit means for impressing between the base and emitter of said transistor a potential which varies in response to voltage changes of said source for controlling the current supplied to said reactor and thereby controlling the voltage of said source, a diode, a second circuit means including said diode for impressing between said base and said emitter a potential which varies in response to current changes of said source for controlling the current of said source, the voltage in said second means exceeding the voltage in said first means at a predetermined value of load current whereby said diode becomes conductive and transfers the control of said source from said first circuit means to said second circuit means.

6. A rectifying arrangement adapted for connection between an alternating current source and a direct current load and comprising in combination rectifying means, saturable reactor means having impedance winding means for controlling the current through said rectifying means and having saturating winding means for controlling the impedance of said impedance winding means, a transistor for controlling the current through said saturating winding means, first circuit means for impressing on the control elements of said transistor a potential which varies in response to variations in the voltage across said load, means for deriving a potential which varies in response to load current variations, a diode, second circuit means for impressing on the control elements of said transistor through said diode the potential which varies in response to load current variations, whereby said diode is non-conductive for values of load current less than a predetermined maximum and conductive for values of load current above said predetermined maximum and the potential applied to said control elements of the transistor is transferred from said first circuit means to said second circuit means substantially at said predetermined maximum load current.

7. In a regulated rectifier arranged for connection between an alternating current source and a direct current load and having saturable reactor means for controlling the flow of current between said source and said load, the combination of a voltage sensing circuit having voltage input terminals, a constant voltage device, a transistor for regulating the saturation of said saturable reactor means, circuit means for impressing on the control elements of said transistor a voltage derived from said voltage input terminals and said constant voltage device, a supply circuit for said voltage sensing circuit comprising resistance means connecting said voltage input terminals to said direct current output terminals, and overload means for connecting said voltage input terminals to a load remote from said direct current output terminals, whereby said voltage input terminals are energized from said load under normal conditions and through said resistance means from said direct current output terminals whenever abnormal conditions cause said overload means to operate and open the circuit between said voltage input terminals and said load.

8. A rectifying arrangement adapted for connection between an alternating current source and a direct current load and comprising in combination first rectifying means, saturable reactor means having a plurality of impedance winding means connected between said source and said first rectifying means and having saturating winding means for controlling the impedance of said impedance winding means, a transistor for controlling the current through said saturating winding means, a transformer having first and second windings, said first winding being energized from said source through one of said impedance windings, said second winding being energized from said source through another of said impedance windings, whereby the exciting current of said transformer produces a voltage drop through said impedance windings in the absence of load current through said first rectifying means, first circuit means for impressing on the control elements of said transistor a potential which varies in response to variations in the voltage across said load, means for deriving a potential which varies in response to load current variations, a diode, second circuit means for impressing on the control elements of said transistor through said diode the potential which varies in response to load current variations, whereby said diode is non-conductive for values of load current less than a predetermined maximum and conductive for values of load current above said predetermined maximum and the potential applied to said control elements of the transistor is transferred from said first circuit means to said second circuit means substantially at said predetermined maximum load current.

9. A rectifying arrangement having alternating current input terminals and first and second direct current load terminals and comprising in combination rectifying means, saturable reactor means having impedance winding means for controlling the current through said rectifying means and having first and second saturating winding means for controlling the impedance of said impedance winding means, a constant voltage device, first and second transistors, one of said transistors being P-N-P type, the other being N-P-N type, a resistance path extending between said load terminals, the base of said first transistor being connected to an intermediate point in said resistance path, the emitter of said first transistor being connected to the first of said load terminals through said constant voltage device, the emitter of said second transistor being connected to said first load terminal, the collector of said first transistor being connected to the base of said second transistor, a resistor connected to the second of said load terminals, a first current path through said resistor and said first saturating winding means to the collector of said second transistor, another current path through said resistor and said second saturating winding means to said first load terminal, said first and second saturating winding means being oppositely polarized, so that an increase of collector current through said second transistor changing the impedance of said impedance winding means is aided by the resulting decrease in current through said second saturating winding means, resulting from the increased voltage drop through said resistor.

References Cited in the file of this patent

UNITED STATES PATENTS

| | | |
|---|---|---|
| 2,751,545 | Chase | June 19, 1956 |
| 2,752,551 | Bixby | June 26, 1956 |
| 2,790,127 | Hamilton | Apr. 23, 1957 |
| 2,810,876 | Huge | Oct. 22, 1957 |
| 2,810,877 | Silver | Oct. 22, 1957 |

UNITED STATES PATENT OFFICE
CERTIFICATE OF CORRECTION

Patent No. 2,937,328                                                 May 17, 1960

Henry M. Huge et al.

It is hereby certified that error appears in the above numbered patent requiring correction and that the said Letters Patent should read as corrected below.

In the grant, lines 1 and 2, for "Henry M. Huge, of Bay Village, and Stephen L. Merkel, of Lorain, Ohio," read -- Henry M. Huge, of Bay Village, and Stephen L. Merkel, of Lorain, Ohio, assignors to Lorain Products Corporation, of Lorain, Ohio, --; line 11, for "Henry M. Huge and Stephen L. Merkel, their heirs" read -- Lorain Products Corporation, its successors --; in the heading to the printed specification, lines 3 and 4, for "Henry M. Huge, Bay Village, and Stephen L. Merkel, Lorain, Ohio" read -- Henry M. Huge, Bay Village, and Stephen L. Merkel, Lorain, Ohio, assignors to Lorain Products Corporation, Lorain, Ohio --.

Signed and sealed this 15th day of November 1960.

(SEAL)
Attest:

KARL H. AXLINE                                            ROBERT C. WATSON
Attesting Officer                                     Commissioner of Patents